Jan. 28, 1941. L. D. WEDDINGTON 2,230,149
APPARATUS FOR TEACHING GUNNERY
Filed Dec. 26, 1939 3 Sheets-Sheet 1
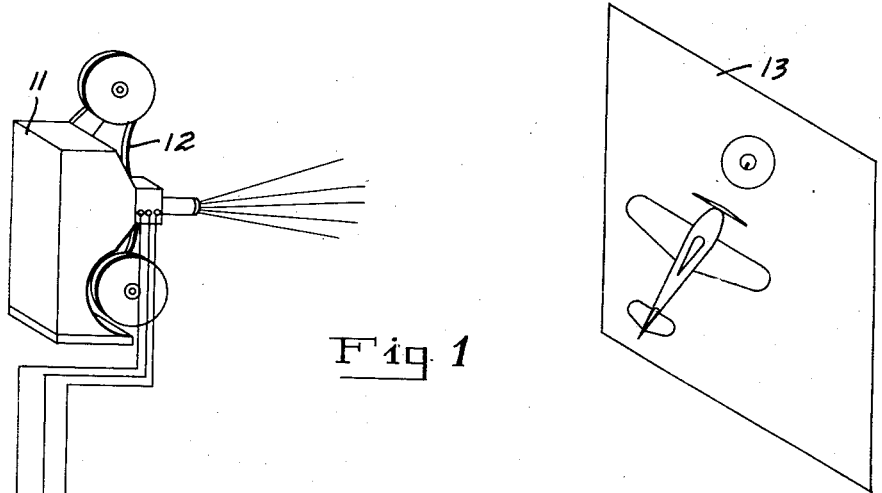
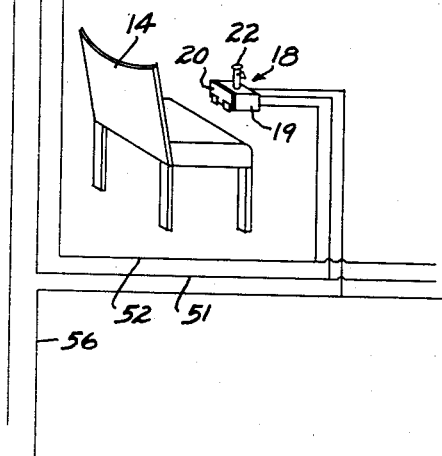
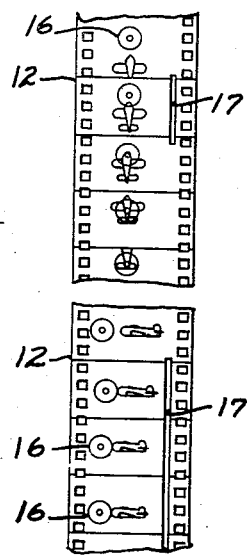
INVENTOR
LEONARD D. WEDDINGTON
BY
ATTORNEYS Jan. 28, 1941. L. D. WEDDINGTON 2,230,149
APPARATUS FOR TEACHING GUNNERY
Filed Dec. 26, 1939 3 Sheets-Sheet 2

INVENTOR
LEONARD D. WEDDINGTON
BY
ATTORNEYS

Jan. 28, 1941.   L. D. WEDDINGTON   2,230,149
APPARATUS FOR TEACHING GUNNERY
Filed Dec. 26, 1939   3 Sheets-Sheet 3
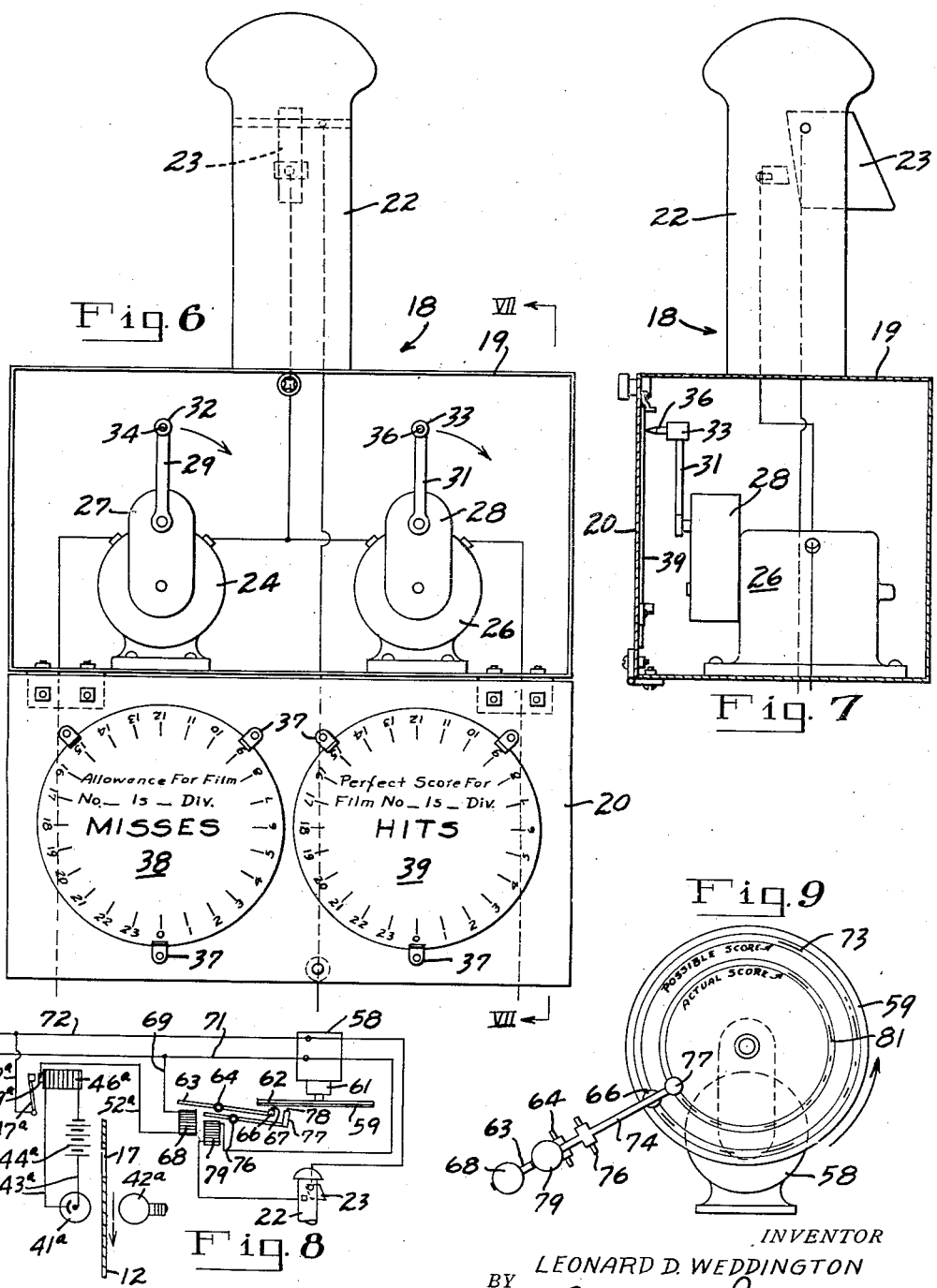
INVENTOR
LEONARD D. WEDDINGTON
BY
ATTORNEYS Patented Jan. 28, 1941

2,230,149

UNITED STATES PATENT OFFICE 2,230,149

APPARATUS FOR TEACHING GUNNERY

Leonard D. Weddington, Birmingham, Ala.

Application December 26, 1939, Serial No. 310,974

7 Claims. (Cl. 35—25)

My invention relates to an improved apparatus for teaching gunnery, and more particularly to teaching aerial gunnery.

Heretofore only two methods of teaching aerial gunnery have been in common use; first by use of the so called gun camera, a device which the student aims as if it were a machine gun and snaps a picture of the moving target; second, by firing at a sleeve or other type of target towed by an airplane. The gun camera has been found to be unsatisfactory as a gunnery training device because of the variables of speed of the target, the angle of the shot, the change there would be in the actual trajectory of a projectile if one were fired along the path indicated by the sights of the gun camera when on the target, and the angular position of the pursuing plane. Training by firing at towed targets has been found to be unsatisfactory because of the danger of hitting the towing plane, the fact that only angular shots may be fired, and the complete lack of similarity between the target and an enemy airplane.

One object of my invention, therefore, is to provide training means for aerial gunners which comprises the use of moving pictures taken with a camera and showing the range of vision of a gunner, into which picture the gun sights intermittently appear, in hit position with respect to the target, and the provision of means so associated with the finished film that when it is flushed on a screen in view of a student gunner a record may be obtained of the number of hits he would have made had he fired at an actual target with the sights in the same position thereon as when he simulated firing during the showing of the training film.

Another object of my invention is to provide an apparatus for training aerial gunners by means of moving pictures showing an airplane in flight with the gun sights of a pursuing plane superimposed on the film, said sights intermittently assuming a hit position with respect to the airplane being pursued, providing a manually operable means which a student gunner viewing the film operates when in his judgment the sights are in hit position, and a means to record whether the student made a hit or a miss on any particular shot, or on all shots collectively, thus indicating his score.

Another object of my invention is to provide a recording means which will indicate to a gunner which type of shot is his weak point, namely, whether he misses more when firing at a moving target from the side, top, rear, or other position, thus indicating to him which type of shot he should practice more.

Another object of my invention is to provide a recording apparatus which will indicate not only whether a single hit has been made on the target, but also whether or not the gunner has fired a burst of shots, and if so how many shots he has fired during such burst.

Another object of my invention is to provide a means to indicate whether or not a gunner has fired a burst at a particular target, that is, for a given hit, whether the student fired a burst of shots both shortly before and shortly after the target has passed into hit relation with the sights.

Another object of my invention is to provide a training apparatus for aerial gunners which greatly reduces the amount of actual flying time required for training and by means of which any number of students may be instructed simultaneously.

A further object of my invention is to provide a simple training apparatus which may be used in conjunction with existing moving picture projectors with but slight change in their construction, and which may be used in theatres and auditoriums without having to specially equip them.

My invention further contemplates the novel construction and arrangement of parts which are illustrated in the accompanying drawings forming a part of this application, and in which:

Fig. 1 is a perspective view showing a moving picture projected on a screen and the general relation of the parts;

Figs. 3 and 4 are views of portions of the film showing gun sights thereon, some of which are on the target in hit position;

Fig. 6 is a rear view of the score recording unit with the rear door open;

Fig. 7 is a view taken on the line VII—VII of Fig. 6 with the door closed;

Fig. 8 is a view corresponding to Fig. 5 but showing a modified form of score recording device; and Fig. 9 is an elevation of the recording mechanism shown in Fig. 8.

Figure 2:
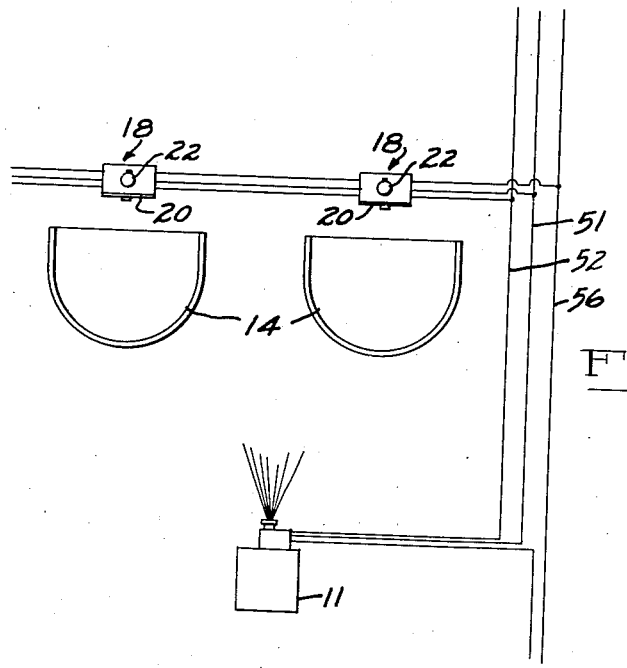
Fig. 2 is a plan view of Fig. 1.

Referring to the drawings, I show a moving picture projector 11, having therein the usual film 12, a screen 13 upon which the picture is projected, and a plurality of seats 14 in which students to be trained are seated in position to view the moving picture.

In Figs. 3 and 4 I show portions of the film 12. On each frame of the picture is a representation of the gun sights 16, comprised of the large and small ring sights and the front bead sight, such as are usually employed on the machine guns of combat airplanes. It is here to be noted that the representation of these sights may either be placed on the film by positioning the camera in the airplane equipped with such sights and taking a picture through the sights, or they may be placed on the film by other means. The only requirement relative to the representation of these sights on the film so far as my invention is concerned, is that they be in the position with respect to the moving target which most nearly approaches what a gunner actually sees when he looks through the sights on the airplane.

The film is provided at certain points along one side with slots 17. These slots are cut on the frame or frames of the picture representing a hit. It is to be noted that at the time a hit may be scored the target is not directly in the center of the sights except when the target is moving directly toward or away from the camera which took the picture and at very close range. The reason for this is that to score a hit, the gunner must, in a split second, compensate for the speed of the target, and the drop or swerve of the projectile due to gravity or wind. If a machine gun is fired at a target 200 yards away and traveling at right angle to the line of the barrel of the gun at 200 miles per hour, it is necessary for the gunner to "lead" the target by approximately 65 feet. The slots 17, therefore, to be opposite the frame or frames of the pictures representing a hit must be cut where the sights are aimed to compensate for distance, speed of the target, and gravity.

In addition, since machine guns are mounted on the airplane with the barrel slightly elevated, the slots must be cut opposite the picture showing the sights in position with respect to the target to make this compensation also. The function of these slots 17 will be hereinafter more fully explained.

Each student to be trained is provided with a small portable unit 18 comprising a box 19, having one side hinged to form a door 20. Projecting from the top of the unit 18 is a handle 22 which conforms to the upper or grip portion of an airplane control stick. The handle is provided with an electric switch 23, which is biased toward open position, and which corresponds to the machine gun trip on the airplane stick.

Figure 5:
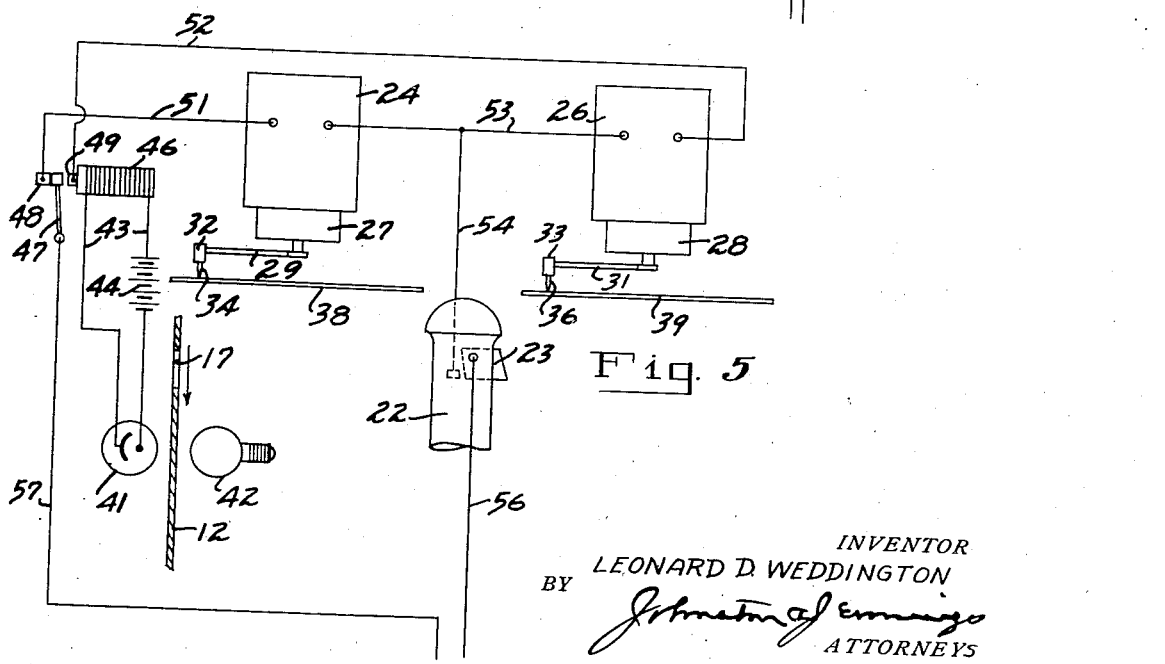
Fig. 5 is a diagrammatic view of portions of the projector, score recording unit, and the manually operable switch, and wiring diagram of the same.

The unit 18 also contains the score recording mechanism, and in the embodiment shown in Figs. 5, 6 and 7, it comprises two small electric motors 24 and 26. Each of the motors is provided with gear trains 27 and 28, adapted to rotate hands 29 and 31 at relatively slow speeds, preferably about one revolution every ten minutes. The hands carry on their outer ends pots 32 and 33 and inking points 34 and 36.

Removably fastened to the door 20 by means of clips 37 is a card 38 marked "Misses." A second card 39 marked "Hits" is similarly secured to the door 20, and both are in such position with respect to the inking points 34 and 36 that when the door is closed the point 34 bears against card 38 and the point 36 bears against card 39 so that when the motors 24 and 26 are energized, circular marks will be made on their respective cards.

Referring now more particularly to Fig. 5, the projector 11 is provided with a photo-electric cell 41 and an exciter light 42, both of which units are so positioned with respect to the path of slots 17 on the moving film 12, that when these slots pass the exciter 42 a beam of light therefrom shines through and excites the cell, making it conductive. A circuit 43 having therein a source of electric energy 44 leads from the cell 41 to an electro-magnet 46, so that whenever light strikes the cell 41 magnet 46 is energized.

The magnet 46 is provided with a movable contact 47, spring biased in contact with a stationary contact 48, and a second stationary contact 49. A conductor 51 leads from contact 48 to one connection of motor 24, and a conductor 52 leads from contact 49 to one connection of motor 26, while a conductor 53 joins the other connection of the two motors. A conductor 54 leads from conductor 53 to one contact of switch 23. A conductor 56 leads from the other contact of switch 23, and a conductor 57 leads from movable contact 47 to one suitable source of electric current, not shown. It will be noted that whenever switch 23 is closed motor 24 will operate and make a mark on card 38 unless magnet 46 is energized, in which case motor 26 alone will turn whereupon card 39 will be marked.

In Figs. 8 and 9 I show a modified form of score recording mechanism which requires only one motor to give both the hit and miss scores. As seen, it comprises a single motor 58 adapted to operate continuously during the showing of the film, and a card 59 adapted to be rotated through reduction gearing 61 at a speed of preferably about one revolution every ten minutes. The card is provided with a backing plate 62 also rotatable on the reduced speed shaft. An arm 63, pivoted at 64, carries an ink pot 66 and an inking point 67. An electro-magnet 68 is adapted to rotate the arm 63 about its pivot 64 whenever it is energized.

The means of energizing magnet 68 comprises the photo-electric cell 41a, exciter 42a, circuit 43a having therein a source of electric energy 44a, and an electro-magnet 46a provided with a movable contact 47a normally biased toward open position and a stationary contact 49a. A conductor 52a leads from stationary contact 49a to one side of magnet 68, and a conductor 69 leads from the other side of magnet 68 to one conductor 71 from a source of power. A conductor 57a leads from movable contact 47a to the other conductor 72 from the source of power. From the foregoing it will be apparent that whenever light passes through slots 17 in the moving film 12, magnet 46a will be energized, movable contact 47a will be brought into contact with 49a, thus energizing magnet 68. When magnet 68 is energized it will rock arm 63 about its pivot 64 and cause inking point 67 to mark card 59, and since card 59 is continuously rotating, inking point 67 will indicate thereon the maximum possible score by marks as shown at 73, Fig. 9.

As a means to mark the card with the actual score made by the student, I provide a second arm 74, pivoted at 76, and carrying at one end an ink pot 77 and inking point 78. An electro-magnet 79 is adapted to be energized by the closing of the manually operable switch 23. Whenever switch 23 is closed, inking point 78 marks the continuously rotating card 59 as shown at 81, Fig. 9, thus giving the actual score made by the student.

It will be noted that the arms 63 and 74 are placed in superimposed relation with respect to each other so that their respective inking points lie radially in line on the card. The reason for this construction is that a comparison of the possible and actual scores may be obtained by comparing the length and relative positions of the lines at any given point. The number, length and positions of slots 17 on the film which produce each of the marks at 73 of the possible score, are known, and hence the type of shot represented by each of the marks at 73 is also known. And, since the actual score of each shot as represented by marks 81 lies immediately adjacent the indication of the possible score, a true score for any given shot can be obtained by a simple comparison of the two sets of marks.

The operation of my improved device embodying the recording mechanism shown in Figs. 5, 6 and 7 is as follows: Any desired number of students are seated in position to view the film. Each is provided with one of the units 18 which is plugged in to the connections 51, 52 and 56. The student holds the unit on his lap with his hand grasping the handle 22 and his finger on the switch 23. As the moving target appears on the screen he closes the switch 23 whenever in his judgment the sights 16 are in hit relation with respect to the target. If he closes the switch at the time when a slot 17 is allowing light to pass therethrough, the motor 26 will operate, thus marking card 39 and indicating a hit. If, however, he closes the switch at any other time, motor 24 will operate and mark card 38, this indicating a miss.

In order to allow the student to fire a burst of shots and not count against his score, hand 29 may be set back a predetermined number of divisions for the particular film being shown. To obtain the true score it is only necessary to subtract the reading of card 39 from that shown on card 38. Since the number of divisions, hand 31 would have to turn to indicate a perfect score is known, the relation of the true score to the perfect score may easily be found.

The operation of my improved device when using the modified score recording device shown in Figs. 8 and 9, so far as the student's position with respect to the film and his closing the switch 23 when the sights are in hit position on the target are concerned, is the same as above described. However, the embodiment of the score recording mechanism shown in Figs. 8 and 9 has certain advantages over the one just described in that it requires only one motor, the actual and possible scores are indicated side by side, and in that the score for any particular shot may be readily compared with the perfect score for that shot.

When the film 12 starts running through the projector, motor 58 is also started and continues to run until the projector is stopped. Every time a slot 17 passes by the photo-electric cell, magnet 68 is energized and card 59 is marked as indicated at 73, thus giving the maximum possible score. Every time the student closes switch 23, magnet 79 is energized and card 59 is marked as indicated at 81, regardless of whether or not a slot 17 is opposite the photo-electric cell. Therefore, to get the true score it is only necessary to compare the length and relative positions of the two sets of marks. Furthermore, since the speed at which the film passes through the projector is known, and the speed at which card 59 is rotating is also known, the particular type of shot may be ascertained by referring back to the film at the known linear distance from its end. Thus the instructor may determine what type of shot a particular student misses most often, and he may be given special practice in that type of shot.

While I have described my invention throughout this specification as relating more particularly to apparatus of teaching gunners to shoot from an airplane at another while in flight, it will be apparent that it may be used with equal success in teaching anti-craft gunners, infantry machine gunners and others.

Also I have shown and described the film as being provided with slots to admit light to the photo-electric cell, but it will be obvious to those skilled in this art that other means may be used, such for instance, as simply removing the emulsion on the film at the desired points.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In apparatus for training gunners, the combination with a cinematographic film including frames each of which bears an image of a target and aiming indicia, the target and aiming indicia being in varied relative positions on the frames, a screen, and projection apparatus for projecting the film on the screen, of a recording mechanism associated with the projection apparatus, and comprising means responsive to manual operation to make a record at selected intervals during the projection of the film adapted for comparison with the images on the film for identifying the particular image with which the record is related for the purposes described.

2. In apparatus for training gunners, the combination with a cinematographic film including frames each of which bears an image of a target and aiming indicia, the target and aiming indicia being in varied relative positions on the frames, a screen, and projection apparatus for projecting the film on the screen, of a recording mechanism associated with the projection apparatus, comprising means to make a record when the image of the aiming indicia is in selected relative positions with respect to the image of the target, and means responsive to manual operation to make a record adapted to be compared with the first of said records for identifying the particular image on said film with which the second of said records is related.

3. Apparatus for teaching aerial gunnery comprising a cinematographic representation of an airplane in flight including frames with representations of gun sights as seen by a gunner outside the airplane superimposed thereon, which gun sights assume at intervals a hit position with respect to the airplane, means to project the representations on a screen, recording mechanism operating in synchronism with the projecting means and comprising means responsive to manual operation to make a record at selected intervals adapted to be compared with the film representations for identifying the particular representation on said film with which the record is related.

4. Apparatus for teaching aerial gunnery comprising cinematographic representations of an airplane in flight including frames with representations of gun sights as seen by a gunner outside the airplane superimposed thereon, which gun sights assume at intervals a hit position with respect to the airplane, means to project the representations on a screen, recording mechanism coordinated with the projection means comprising means to record the times when the representations of the sights are in hit position with respect to the representations of the airplane, and other means responsive to manual operation to make a record adapted to be compared with the first mentioned record.

5. Apparatus for teaching aerial gunnery comprising a moving picture projector, a film therein including frames depicting a moving target, aiming indicia on the film arranged intermittently in hit and miss relation with respect to the moving target, a screen upon which the picture is projected, an electric circuit, means associated with the film to energize said circuit when a picture representing a hit is on the screen, a recording mechanism operable responsive to said energization, a second electric circuit, a second recording mechanism in said second circuit, manually operable switch mechanism corresponding to a gun trigger in the second circuit for effecting operation of the second recording mechanism and make a record comparable with the first record adapted to determine whether the manual operation took place when a picture representing a hit was on the screen.

6. Apparatus for teaching gunnery comprising a cinematographic representation including frames showing a moving target and a representation of aiming indicia in intermittent hit and miss relation with respect to the representation of the target, a screen, means to project the representation on the screen, means responsive to the aiming indicia being in hit relation to the target to make a record thereof, mechanism corresponding to a gun trigger, means responsive to manual operation of the trigger mechanism to make a second record in comparative relationship to the first adapted to determine if the manual operation took place when the aiming indicia was in hit relation.

7. Apparatus for teaching aerial gunnery comprising a moving picture projector, a film therein including frames depicting an image of a moving target and having an image of aiming indicia thereon in intermittent hit and miss relation with respect to the moving target, a screen upon which the picture is projected, an electric circuit, means associated with the film to energize the circuit when the target and aiming indicia are in hit relation on the screen, recording means in the circuit operable responsive to energization of said circuit, a second circuit, recording means in said second circuit, switch mechanism corresponding to a gun trigger in said second circuit adapted when closed to operate its associated recording means to make a record in comparative relationship to the first and adapted to determine whether the switch was closed while the target and aiming indicia were in hit relation.

LEONARD D. WEDDINGTON.